US008827369B2

(12) United States Patent
Izawa et al.

(10) Patent No.: US 8,827,369 B2
(45) Date of Patent: Sep. 9, 2014

(54) BEARING STRUCTURE USING RESIN BUSH

(75) Inventors: Hiroshi Izawa, Tochigi (JP); Makoto Takeuchi, Tochigi (JP); Takahiro Kobori, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 782 days.

(21) Appl. No.: 12/978,835

(22) Filed: Dec. 27, 2010

(65) Prior Publication Data

US 2011/0156464 A1 Jun. 30, 2011

(30) Foreign Application Priority Data

Dec. 28, 2009 (JP) ................................ 2009-297669

(51) Int. Cl.
*A47C 7/54* (2006.01)
*B60N 2/46* (2006.01)
*F16C 17/00* (2006.01)
*F16C 17/02* (2006.01)
*F16C 33/20* (2006.01)

(52) U.S. Cl.
CPC ................ *A47C 7/54* (2013.01); *B60N 2/4606* (2013.01); *F16C 17/02* (2013.01); *F16C 33/20* (2013.01)
USPC ....... 297/411.32; 403/199; 384/275; 384/295

(58) Field of Classification Search
USPC .......... 297/411.32, 411.3; 403/192, 194, 195, 403/197, 199, 238, 239, 243; 384/275, 276, 384/295
See application file for complete search history.

(56) References Cited

U.S. PATENT DOCUMENTS

| 3,415,155 | A | * | 12/1968 | Riddell et al. | ................ | 411/548 |
| 3,439,889 | A | * | 4/1969 | Karlsen | ...................... | 244/122 R |
| 3,481,655 | A | * | 12/1969 | Campbell | ..................... | 384/536 |
| 3,514,129 | A | * | 5/1970 | Holdren | ..................... | 285/140.1 |
| 4,624,585 | A | * | 11/1986 | Nix et al. | ....................... | 384/296 |
| 4,675,937 | A | * | 6/1987 | Mitomi | .......................... | 16/2.1 |
| 4,750,878 | A | * | 6/1988 | Nix et al. | ...................... | 384/296 |
| 4,883,319 | A | * | 11/1989 | Scott | .......................... | 297/354.1 |
| 5,042,877 | A | * | 8/1991 | Yokota | ..................... | 297/411.32 |
| 5,145,264 | A | * | 9/1992 | Bryden et al. | ................ | 384/275 |
| 5,388,915 | A | * | 2/1995 | Huber | ........................... | 384/439 |
| 5,462,365 | A | * | 10/1995 | Brandt | .......................... | 384/294 |
| 5,577,843 | A | * | 11/1996 | Leininger et al. | ............. | 384/275 |
| 5,669,107 | A | * | 9/1997 | Carlsen et al. | .................. | 16/348 |
| 5,752,739 | A | * | 5/1998 | Saeki | ............................. | 297/113 |
| 6,089,484 | A | * | 7/2000 | Zwayer et al. | ................ | 242/321 |

(Continued)

FOREIGN PATENT DOCUMENTS

JP         2005-287724 A      10/2005

*Primary Examiner* — David R Dunn
*Assistant Examiner* — Richard Lowry
(74) *Attorney, Agent, or Firm* — Carrier Blackman & Associates, P.C.; William D. Blackman; Joseph P. Carrier

(57) ABSTRACT

According to a first aspect of the invention, there is provided a bearing structure including: a resin bush having a flange formed to be brought into contact with a plate face around a bearing hole from one side, a locking edge formed to be locked with the plate face around the bearing hole from the other side, and a circular through-hole formed to bear the support shaft inserted therethrough, wherein, upon receiving a load applied to the support shaft, the entire resin bush is flexibly displaced so that an inner circumferential surface of the through-hole is aligned with a hole edge of the bearing hole and the support shaft is born by the hole edge of the bearing hole.

15 Claims, 19 Drawing Sheets

(56) References Cited

U.S. PATENT DOCUMENTS

| | | | |
|---|---|---|---|
| 6,132,128 A * | 10/2000 | Burrows | 403/96 |
| 7,220,056 B2 * | 5/2007 | Kubota et al. | 384/215 |
| 7,632,019 B2 * | 12/2009 | Gilbertson | 384/295 |
| 8,534,761 B2 * | 9/2013 | Saxton | 297/411.32 |
| 2002/0085778 A1 * | 7/2002 | Mena | 384/276 |
| 2003/0002758 A1 * | 1/2003 | Wyer | 384/295 |
| 2009/0184559 A1 * | 7/2009 | Nakaya et al. | 297/411.32 |

* cited by examiner

BEARING STRUCTURE USING RESIN BUSH

CROSS-REFERENCE TO RELATED APPLICATION(S)

This application claims priority from Japanese Patent Application No. 2009-297669 filed on Dec. 28, 2009, the entire contents of which are incorporated herein by reference.

BACKGROUND

1. Field of the Invention

The present invention related to a bearing structure in which a resin bush is inserted into a bearing hole formed in one constituent member, and a support shaft protruding from the other constituent member is inserted into the bearing hole through the resin bush so as to be rotatbly supported thereon.

2. Description of the Related Art

JP-2005-287724-A discloses an armrest provided on a side of a vehicle seat. In JP-2005-287724-A, a support shaft extends from a backside frame of the vehicle seat, bearing holes are formed in facing frames of the armrest at a base portion, and the support shaft is inserted into the bearing holes to support the armrest in the width direction. The armrest is stored at a side of a seat back in an erected state and forwardly reclined from the erected state with the support shaft as a pivot.

In the armrest, an arc-like guide hole is formed in a plate face of the armrest frame with the support shaft as a center, a stopper pin for regulating a rotation range of the armrest is protruded from a plate face of the backside frame at a position apart from the support shaft and inserted into the guide hole, and a hook-like lock cam is provided to the backside frame to be engageable with the stopper pin to thereby store the armrest at the side of the seat back in the erected state.

In the armrest, metal bushes are mounted onto the stopper pin to smoothen engagement/disengagement of the lock cam with/from the stopper pin.

In the metal bushes, a cylindrical portion (main body) is fitted with the stopper pin, a flange is formed at one end of the cylindrical portion, an inner cylindrical surface of the cylindrical portion and a flange surface of the flange faced to the armrest frame are coated with a resin having a low frictional coefficient (see JP-2005-287724-A).

Here, when further bushes for the support shaft are provided in addition to the bushes for the stopper pin, a rotational movement of the armrest can be further smoothened.

However, when the metal bushes are mounted into bearing holes of the armrest frames for inserting the support shaft therethrough, since an excessive load is applied to the support shaft during the use of the armrest, the resin coating of the bushes may be easily abraded. Further, since the bushes are formed of metal, it is necessary to process the cylinder end of the cylindrical portion or the shaft end of the support shaft so as to prevent the bushes from dropping from the bearing holes, and workability for the assembly is deteriorated.

By using a resin bush instead of the metal bush, the above-mentioned drop-out prevention process may be omitted with a simple structure. However, when the resin bushes are mounted into the bearing holes for inserting the support shaft to support the armrest, since an excessive load is applied to the support shaft during the use of the armrest as described above, the bushes may be crushed and destroyed.

SUMMARY

One object of the invention is to provide, for example, in an armrest of a vehicle seat, a bearing structure using a resin bush for a support shaft to support the armrest while preventing the resin bush from being crushed and destroyed even when an excessive load is applied to the support shaft during the use of the armrest.

According to a first aspect of the invention, there is provided a bearing structure inserted into and fixed to a bearing hole formed in one constituent element for bearing a support shaft protruded from the other constituent element, the bearing structure including: a resin bush having a flange, at one end, formed to be brought into contact with a plate face of the one constituent member around the bearing hole from one side, a locking edge, at the other end, formed to be locked with the plate face of the one constituent member around the bearing hole from the other side, and a circular through-hole, at a enter, formed to bear the support shaft inserted therethrough, wherein, upon receiving a load applied to the support shaft, the entire resin bush is flexibly displaced so that an inner circumferential surface of the through-hole is aligned with a hole edge of the bearing hole and the support shaft is born by the hole edge of the bearing hole.

According to a second aspect of the invention, there is provided the bearing structure, wherein the resin bush further has a cylindrical body defining circular through-hole while being inserted into the bearing hole, the flange being formed at one end of the cylindrical body, the locking edge being formed at the other end of the cylindrical body, a partition cut formed to open through the locking edge, the cylindrical body and the flange, and thin-walled portions formed to extend from both sides of the partition cut along an outer circumferential surface of the cylindrical body with a reduced thickness, wherein, in the one constituent element, a protrusion is formed at the hole edge of the bearing hole to be positioned within the partition cut and not to reach the inner circumferential surface of the through-hole, and wherein, upon receiving the load applied to the support shaft, the cylindrical body is flexibly displaced at the thin-walled portions so that the inner circumferential surface of the through-hole is aligned with a protrusion end surface of the protrusion and the support shaft is born by the protrusion end surface of the protrusion.

According to a third aspect of the invention, there is provided the bearing structure, wherein the resin bush further has a cutout formed to open the cylindrical body except for the flange or the locking edge at a position apart from the partition cut.

According to a fourth aspect of the invention, there is provided the bearing structure, wherein the resin bush further has a bearing piece formed on the flange to rise from the hole edge of the through-hole so as to face the support shaft inserted through the through-hole, the locking edge being continuously extended from a protrusion end of the bearing piece, and a loophole formed in the flange around a rising base of the bearing piece, wherein, in the one constituent element, the bearing hole is formed so that the hole edge thereof does not reach a hole edge of the through-hole and a groove is formed around the hole edge of the bearing hole to receive the bearing piece, and wherein, upon receiving the load applied to the support shaft, the bearing piece is flexibly displaced into the groove through the loophole so that the inner circumferential surface of the through-hole is aligned with the hole edge of the bearing hole and the support shaft is born by the hole edge of the bearing hole.

According to a fifth aspect of the invention, there is provided the bearing structure, wherein the resin bush further has guide blades formed on both sides of the bearing piece to slidingly guide the flexible displacement of the bearing piece along both edges of the groove.

According to a sixth aspect of the invention, there is provided an armrest of a vehicle seat, using the above-mentioned bearing structure, wherein the one constituent element is one of an armrest frame of the armrest and a backside frame of the vehicle seat, and the other constituent element is the other of the armrest frame and the backside frame.

In the above-mentioned bearing structure and the above-mentioned armrest, a resin bush is used. In the resin bush, a flange coming in contact with the plate face of one constituent member around one hole edge of the bearing hole formed in the one constituent member (one of the armrest frame and the backside frame) is formed at one end thereof, a locking edge locked to the plate face of the one constituent member around the other hole edge of the bearing hole is formed at the other end thereof, and a circular through-hole for inserting the support shaft protruding from the other constituent member (the other of the armrest frame and the backside frame) therethrough is formed at the center thereof. As a result, the drop-out of the resin bush from the bearing hole is prevented by the flange and the locking edge.

According to the first aspect of the invention, the bush is inserted into and fixed to the bearing hole formed in one constituent member and the support shaft protruding from the other constituent member is inserted through the through-hole of the bush so as to rotatably bear the support shaft. Accordingly, by assembling the resin bush in which the entire bush is flexibly displaced with the load applied to the support shaft, the inner circumferential surface of the through-hole is aligned with the hole edge of the bearing hole, and the support shaft is born by the hole edge of the bearing hole, the bush can be assembled without being crushed and destroyed even when the resin bush bears the support shaft.

According to the second aspect of the invention, the resin bush includes a cylindrical body inserted into the bearing hole and defining the circular through-hole formed at the center between the flange and the locking edge. The bush is inserted into and fixed to the bearing hole and the support shaft is inserted through the through-hole of the bush so as to rotatably bear the support shaft. A partition cut opened through the locking edge, the cylindrical body and the flange and thin-walled portions with a reduced thickness of the cylindrical body extending from both sides of the partition cut to the outer circumferential surface of the cylindrical body are formed in the resin bush, a protrusion is formed at the hole edge of the bearing hole to be positioned within the partition cut and not to reach the inner circumferential surface of the through-hole, the cylindrical body is flexibly displaced at the thin-walled portions with the load applied to the support shaft, the inner circumferential surface of the through-hole is aligned with the protrusion end surface of the protrusion, and the support shaft is born by the protrusion end surface of the protrusion. Accordingly, the bush can be assembled without being crushed and destroyed even when the resin bush bears the support shaft. By providing the partition cut and the thin-walled portions, the entire bush can be made to be flexible and thus can be assembled into the bearing hole. Since the partition cut is formed correspondingly with the protrusion, the positioning is carried out well when inserting the bush into the bearing hole, thereby easily determining the assembly direction.

According to the third aspect of the invention, in the resin bush, a cutout is opened in the cylindrical body and one of the flange and the locking edge, at a position apart form the partition cut. Accordingly, the entire bush is allowed to be deformed at the cutout in accordance with the flexible displacement of the cylindrical body at the thin-walled portions, thereby further promoting the flexible displacement of the cylindrical body so that the bush is surely assembled without being crushed and destroyed.

According to the fourth aspect of the invention, a bearing piece faced to the support shaft inserted through the through-hole is formed on the flange of the bush so as to rise from the hole edge of the through-hole, a loophole is formed in the flange around the rising base of the bearing piece, and the through-hole of the resin bush having the hole edge not reaching the hole edge of the bearing hole and the groove recessed from the hole edge of the bearing hole to receive the bearing piece are formed. The bearing piece is flexibly displaced to the deep side of the groove through the loophole, the inner circumferential surface of the through-hole is aligned with the hole edge of the bearing hole, and the support shaft is born by the hole edge of the bearing hole. Accordingly, the bush can be assembled without being crushed and destroyed even when the resin bush bears the support shaft. By providing the flexible bearing piece, the entire bush can be made to be flexible and can be easily assembled into the bearing hole. Since the bearing piece is provided correspondingly with the groove, the positioning is carried out well when inserting the bush into the bearing hole, thereby easily determining the assembly direction.

According to the fifth aspect of the invention, guide blades are formed on both sides of the bearing piece for sliding along both edges of the groove when the bearing piece flexibly displaces. Accordingly, the bush can be assembled so that the bearing piece can be stably flexibly displaced to the loophole by the guide blades.

According to the sixth aspect of the invention, the armrest of the vehicle seat includes the bearing structure using the above-mentioned resin bush. Accordingly, when the resin bush is inserted into and fixed to the bearing hole formed in the backside frame and the support shaft of the armrest is inserted through the resin bush to be born, the bush can be prevented from being crushed and destroyed even when an excessive load is applied to the support shaft during the use of the armrest.

DRAWINGS

Figure 5:
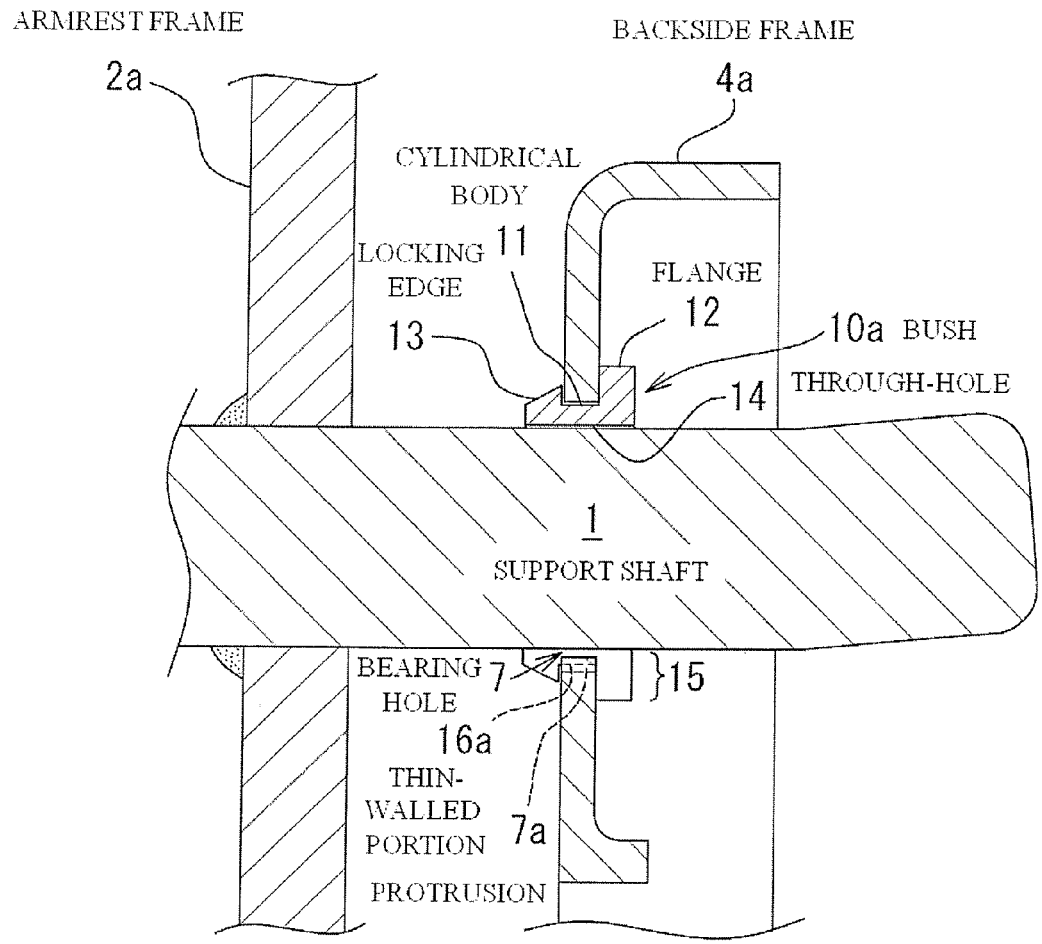
FIG. 5 is a sectional view of the bearing structure using the resin bush shown in FIG. 1.
Figure 7A:
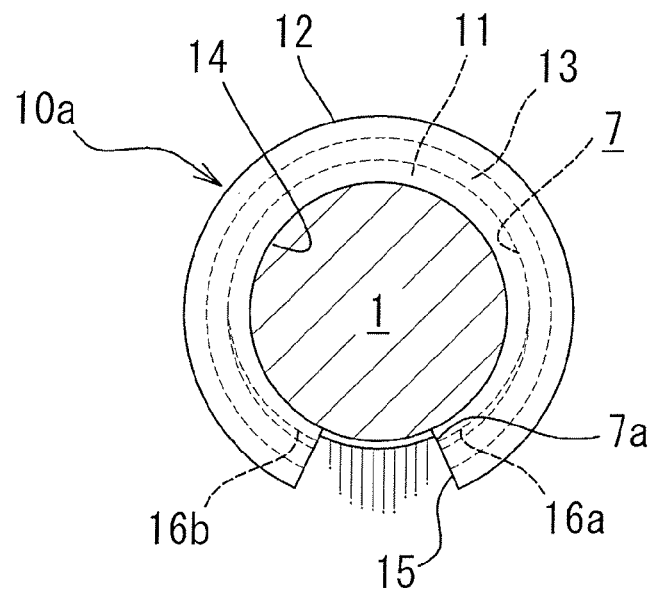

FIG. 7A partially illustrates the bearing structure using the resin bush shown in FIG. 5.

Figure 7B:
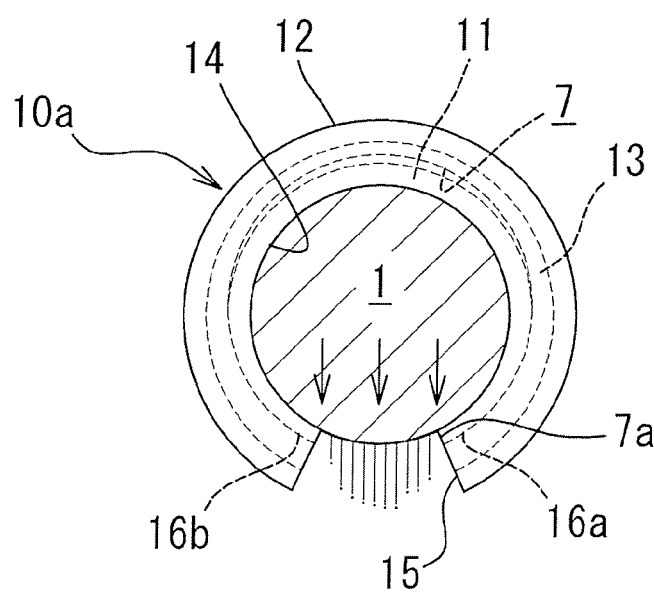

FIG. 7B illustrates a state where a load is applied to the bearing structure using the resin bush shown in FIG. 7A.

Figure 8A:
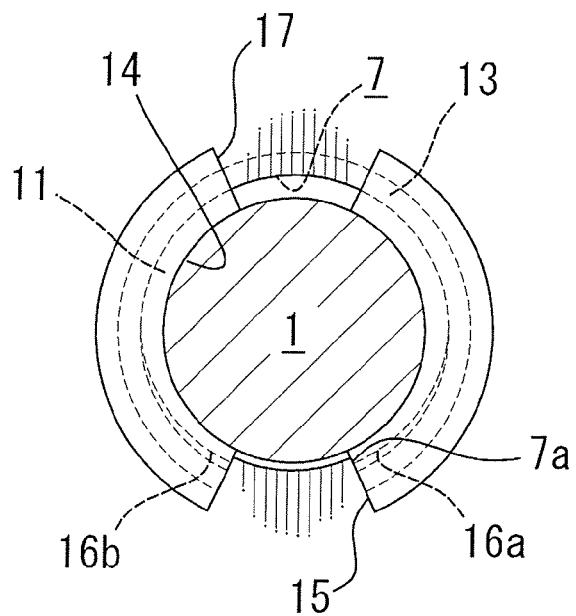

FIG. 8A illustrates a first modified example of the bearing structure using the resin bush shown in FIG. 7A.

Figure 8B:
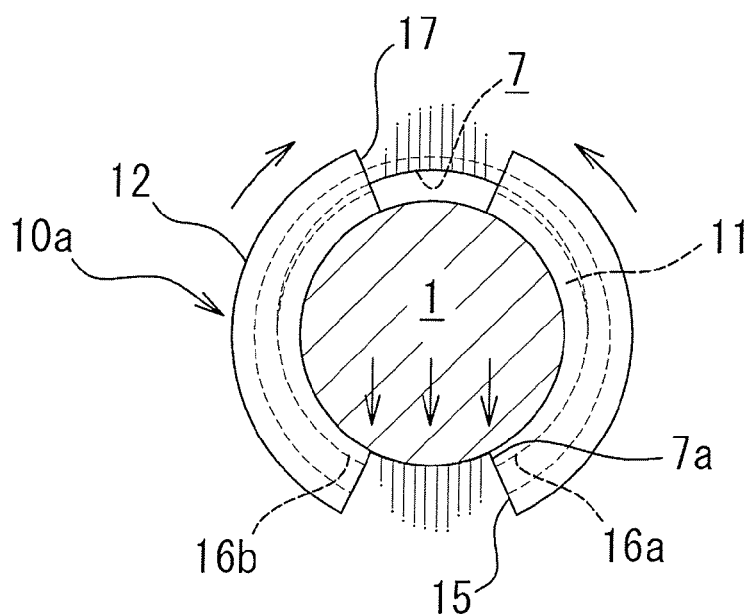

FIG. 8B illustrates a state where a load is applied to the bearing structure using the resin bush shown in FIG. 8A.

Figure 9A:
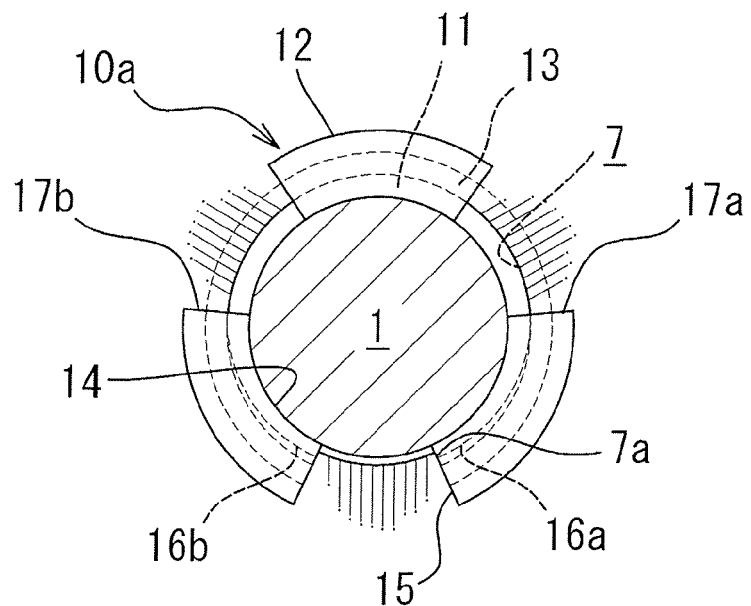

FIG. 9A illustrates a second modified example of the bearing structure using the resin bush shown in FIG. 7A.

Figure 9B:
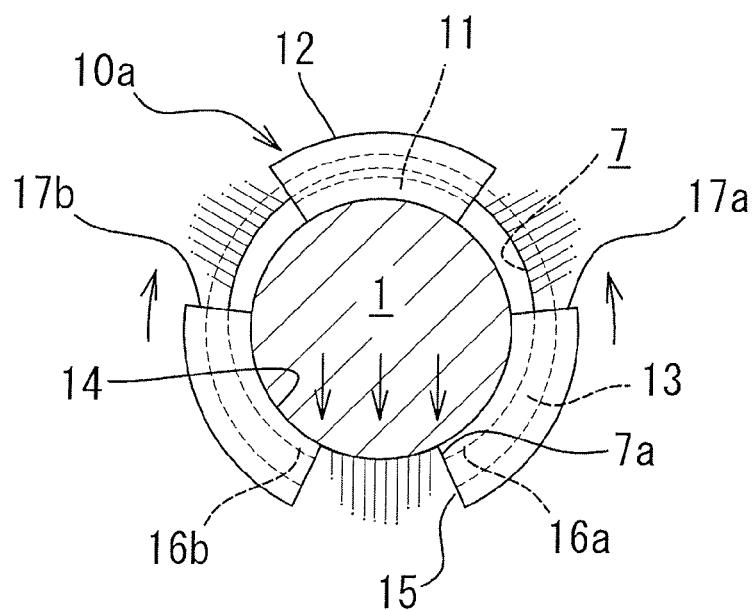

FIG. 9B illustrates a state where a load is applied to the bearing structure using the resin bush shown in FIG. 9A.

Figure 10:
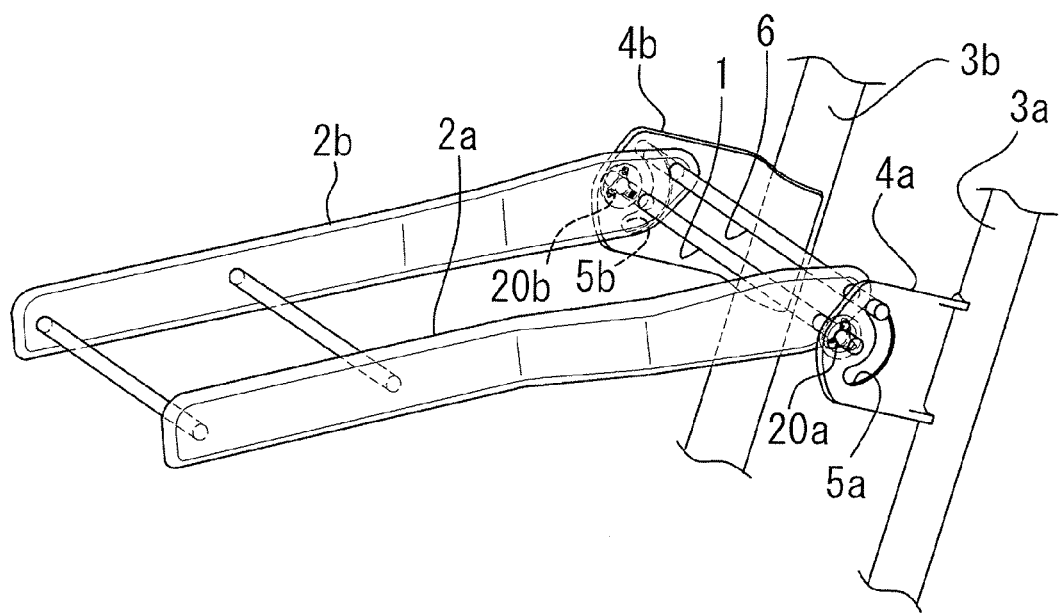

FIG. 10 illustrates the frame structure of an armrest of a vehicle seat assembled with a bearing structure using a resin bush according to a second embodiment.

Figure 11:
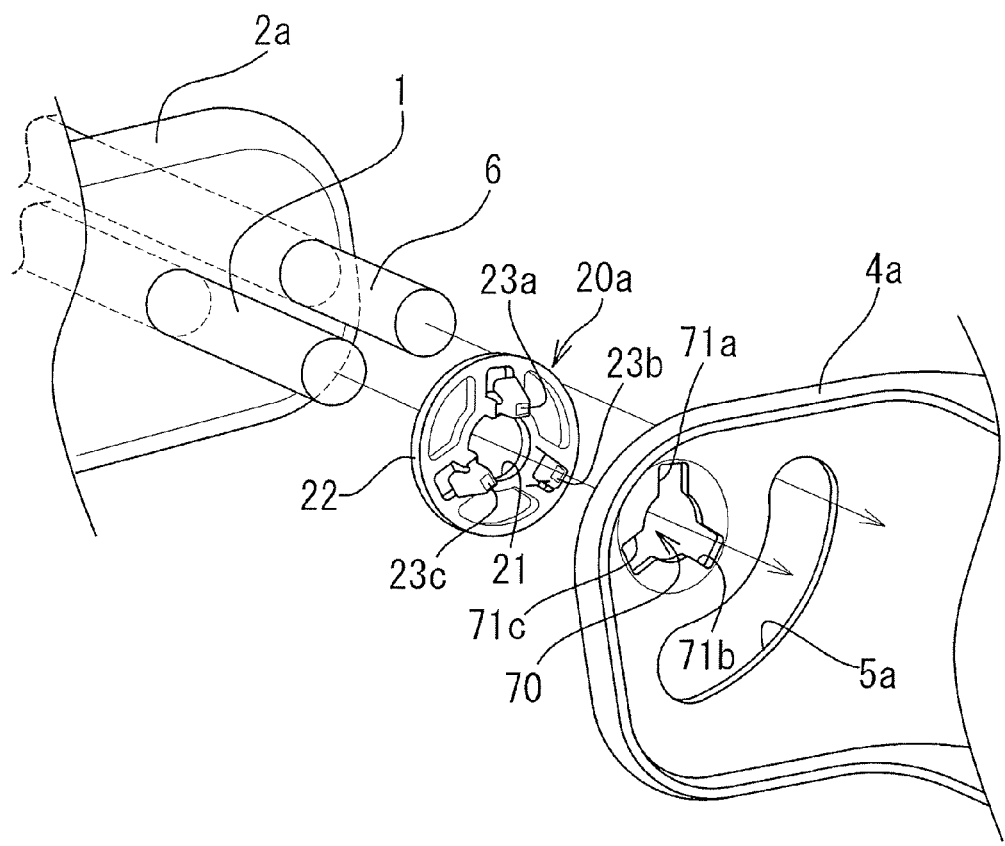

FIG. 11 is an exploded perspective view of the bearing structure using a resin bush shown in FIG. 10.

Figure 12A:
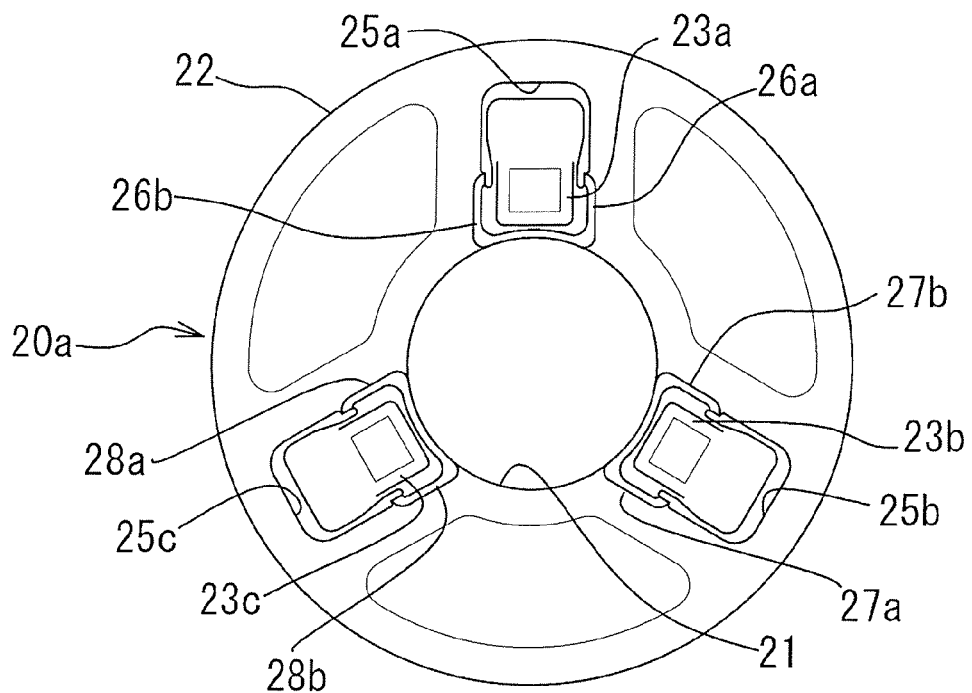

FIG. 12A is a front view of the resin bush shown in FIG. 11.

Figure 12B:
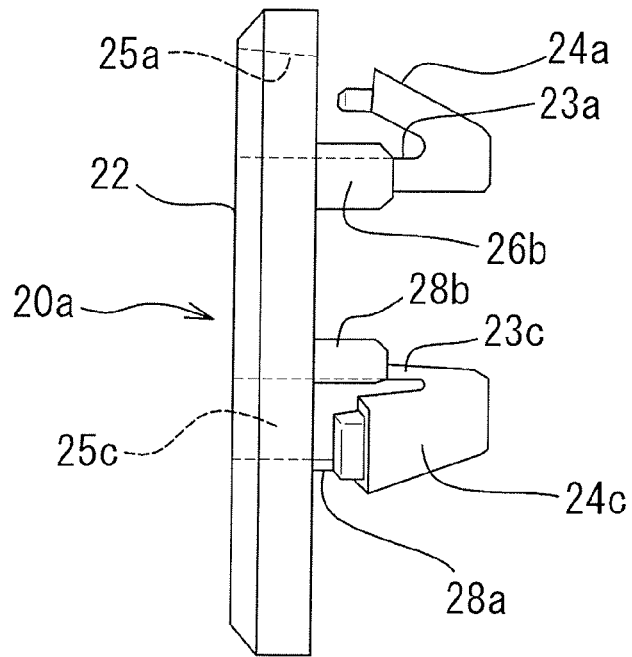

FIG. 12B is a side view of the resin bush shown in FIG. 12A.

Figure 12C:
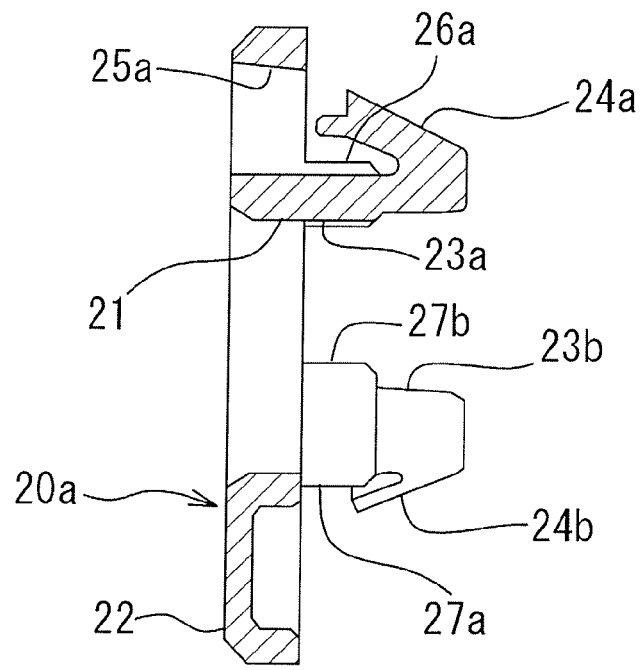

FIG. 12C is a sectional view of the resin bush shown in FIG. 12A.

Figure 13:
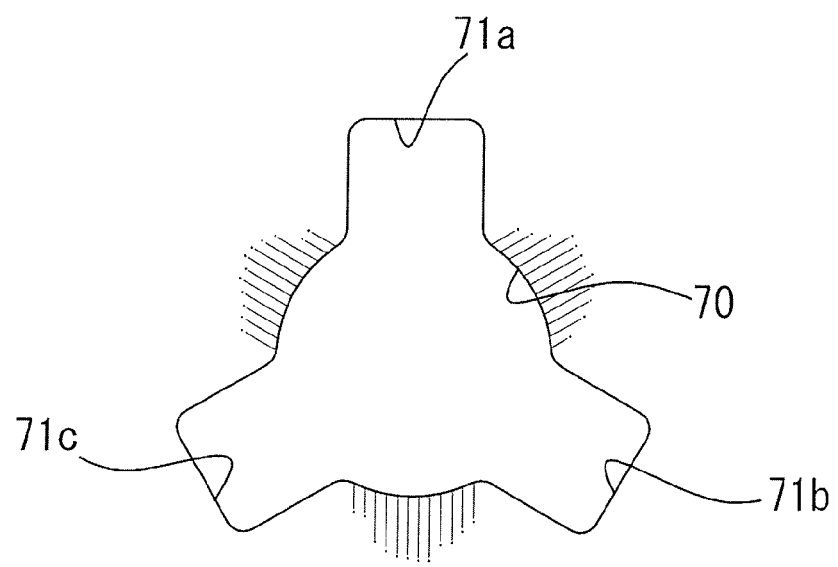

FIG. 13 is a front view of a bearing hole into which the bush shown in FIG. 12C is inserted.

Figure 14:
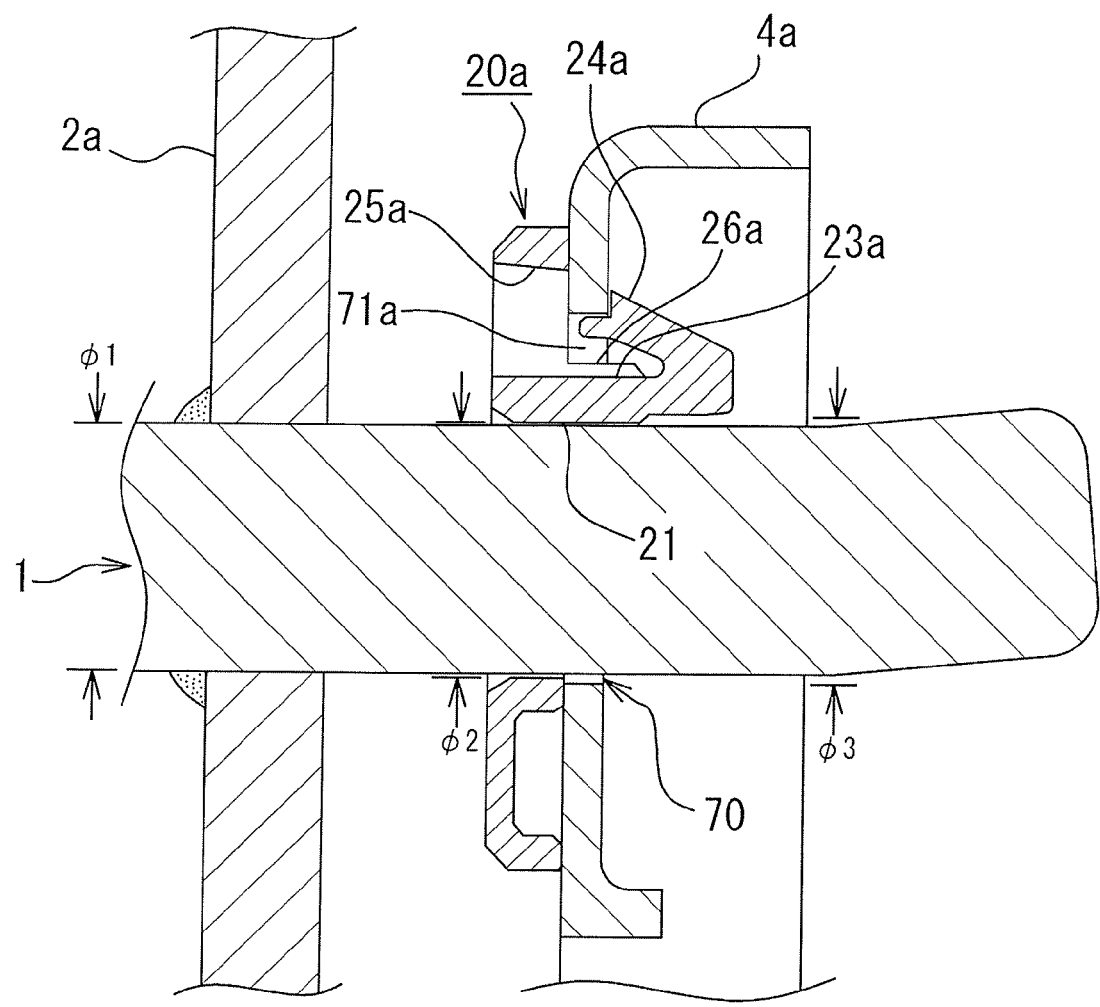

FIG. 14 is a sectional view of the bearing structure using the resin bush shown in FIG. 12C.

Figure 15:
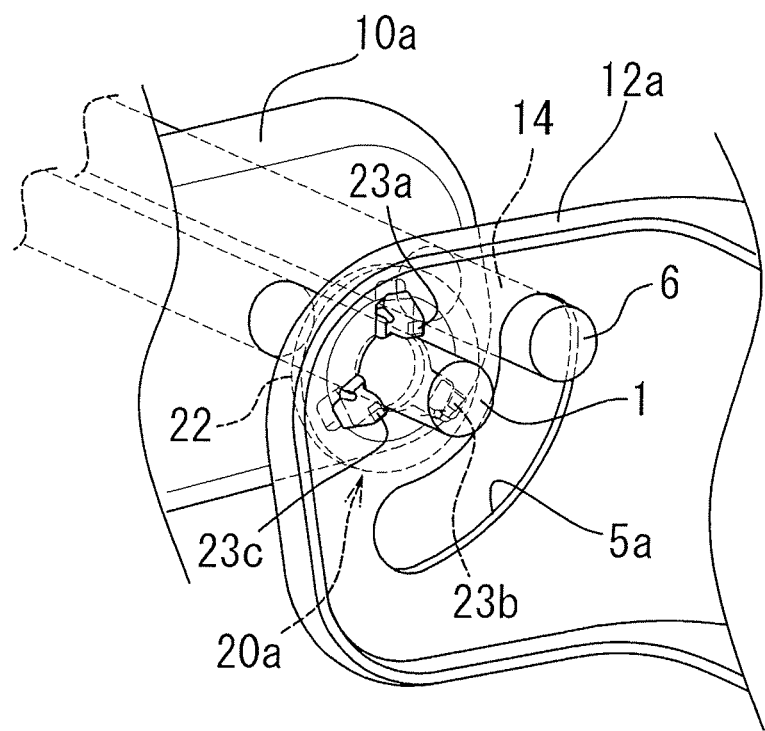

FIG. 15 illustrates the bearing structure using the resin bush shown in FIG. 14.

Figure 16A:
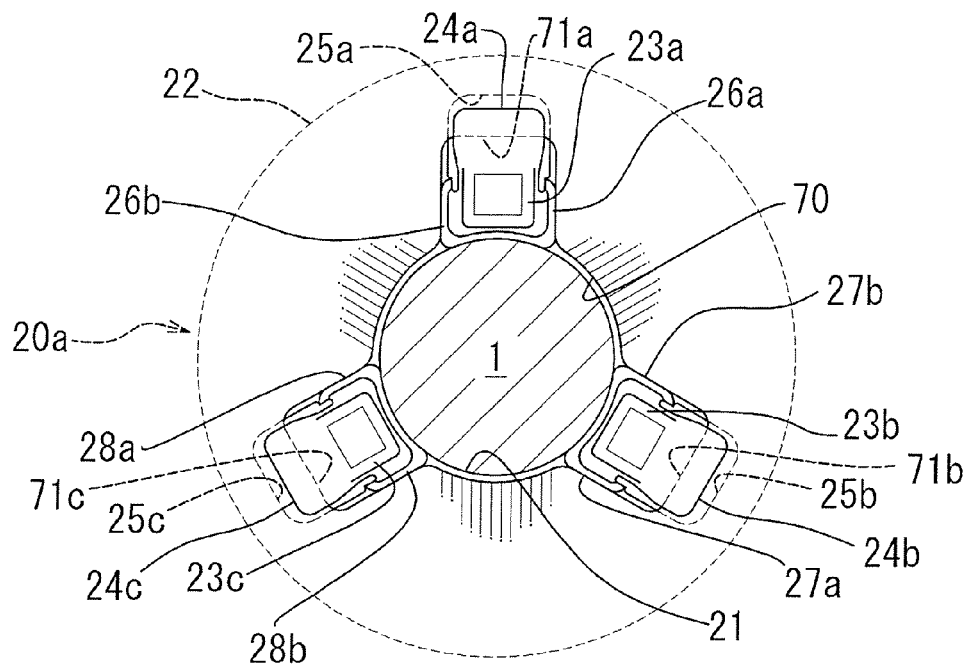

FIG. 16A partially illustrates the bearing structure using the resin bush shown in FIG. 12A.

Figure 16B:
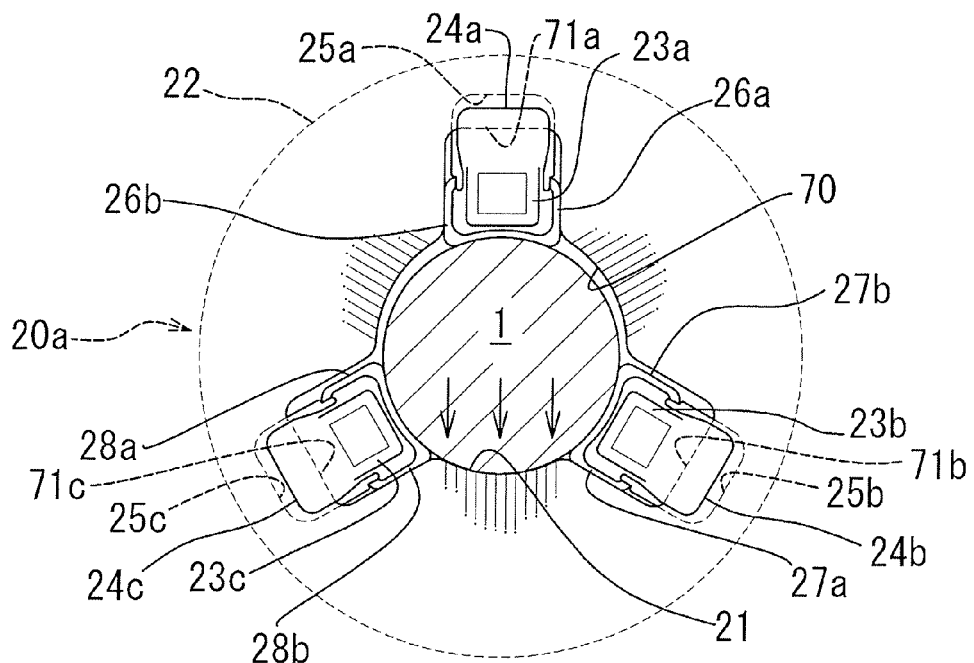

FIG. 16B illustrates a state where a load is applied to the bearing structure using the resin bush shown in FIG. 16A.

Figure 17:
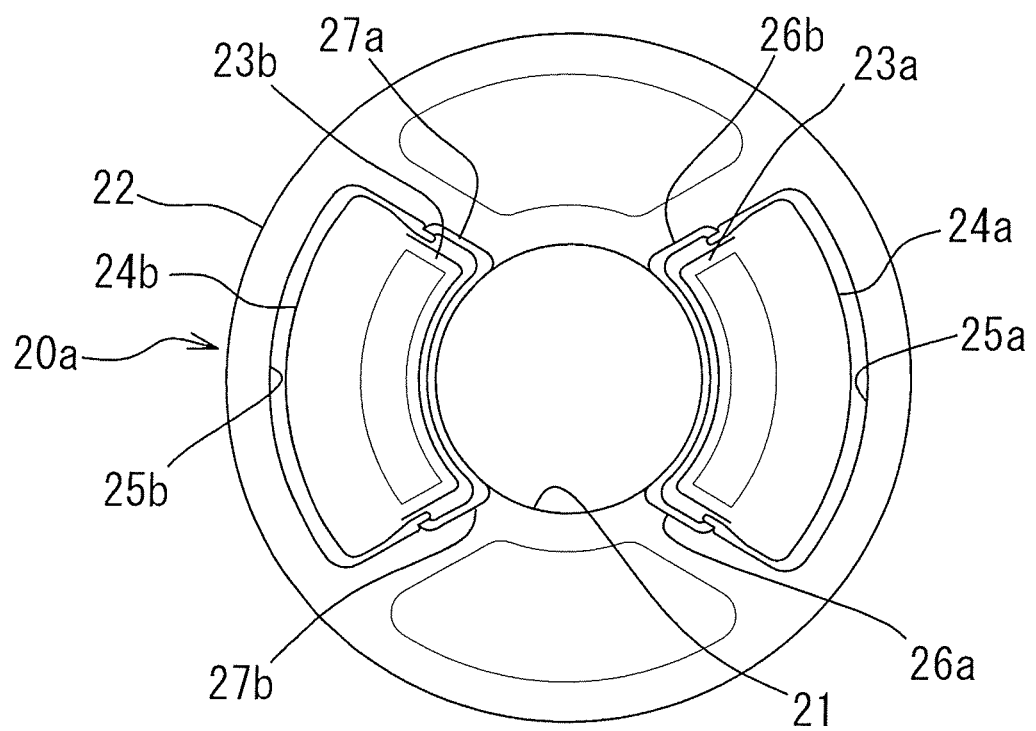

FIG. 17 is a front view of a modified example of the resin bush shown in FIG. 12A.

Figure 18:
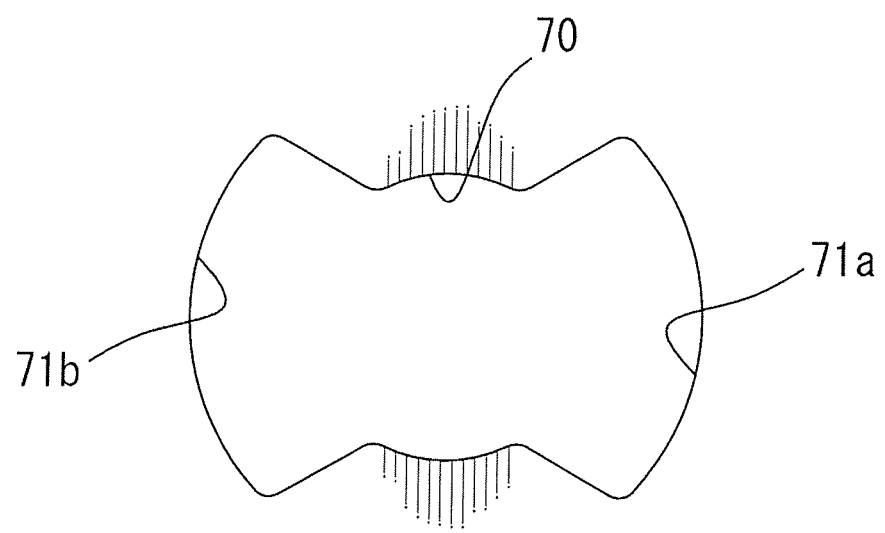

FIG. 18 is a front view of a bearing hole into which the bush shown in FIG. 17 is inserted.

Figure 19A:
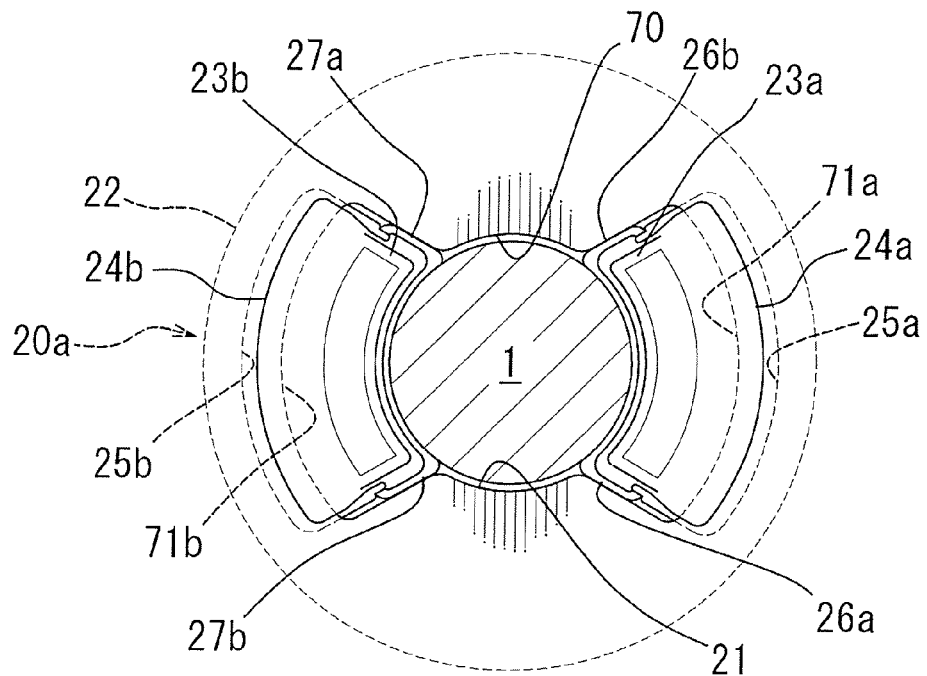

FIG. 19A illustrates the bearing structure using the resin bush shown in FIG. 17.

Figure 19B:
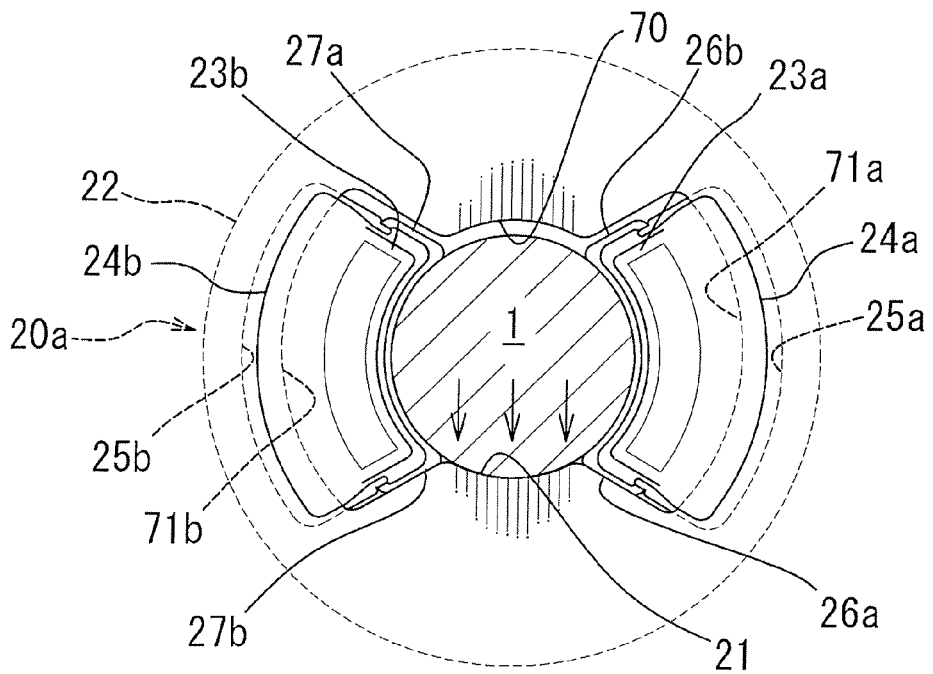

FIG. 19B illustrates a state where a load is applied to the bearing structure using the resin bush shown in FIG. 19A.

DETAILED DESCRIPTION

Figure 1:
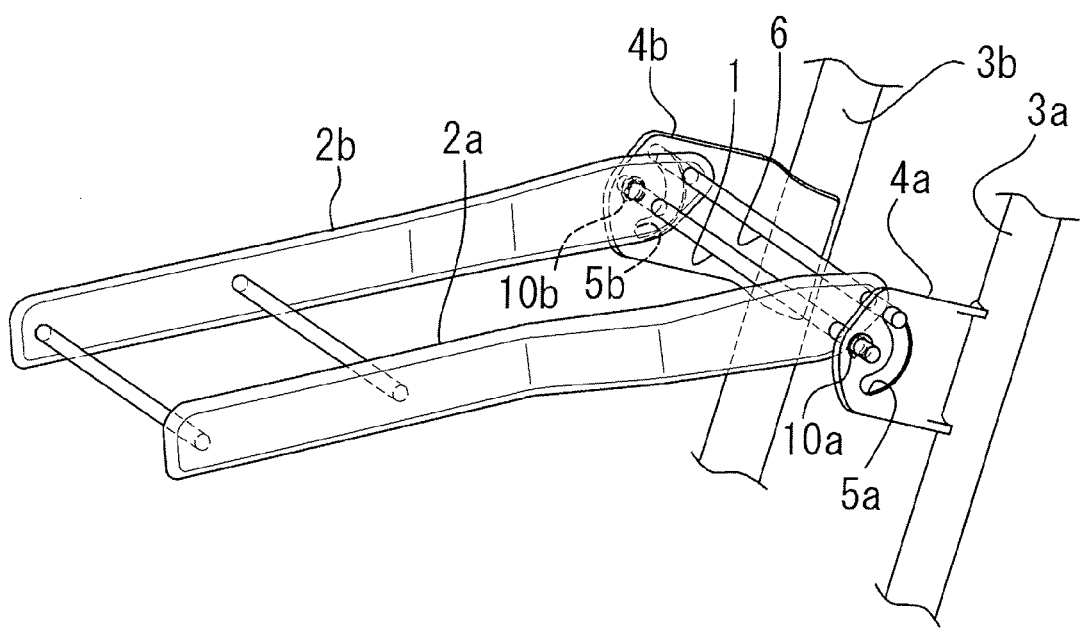
FIG. 1 illustrates the frame structure of an armrest of a vehicle seat assembled with a bearing structure using a resin bush according to a first embodiment.

An embodiment may be described with an armrest of a vehicle seat with a bearing structure using a resin bush as an example. In the embodiment, as shown in FIG. 1, a laterally-extending support shaft 1 is hanged and fixed between armrest frames 2a and 2b faced to each other, a bush bearing hole (no reference numeral is shown in FIG. 1) to be described later is formed in bracket plates 4a and 4b of backside frames 3a and 3b located on one side of a seat back. Thus, the armrest can be stored at a side of the seat back in an erected state and forwardly reclined from the erected state. Further, arc-like guide holes 5a and 5b are formed in plate faces of the bracket plates 4a and 4b with the support shaft 1 as a center, and a stopper shaft 6 protruded from the plate faces of the armrest frames 2a and 2b at a position apart from the support shaft 1 are inserted into the guide holes 5a and 5b, thereby regulating a rotation range of the armrest.

Figure 2:
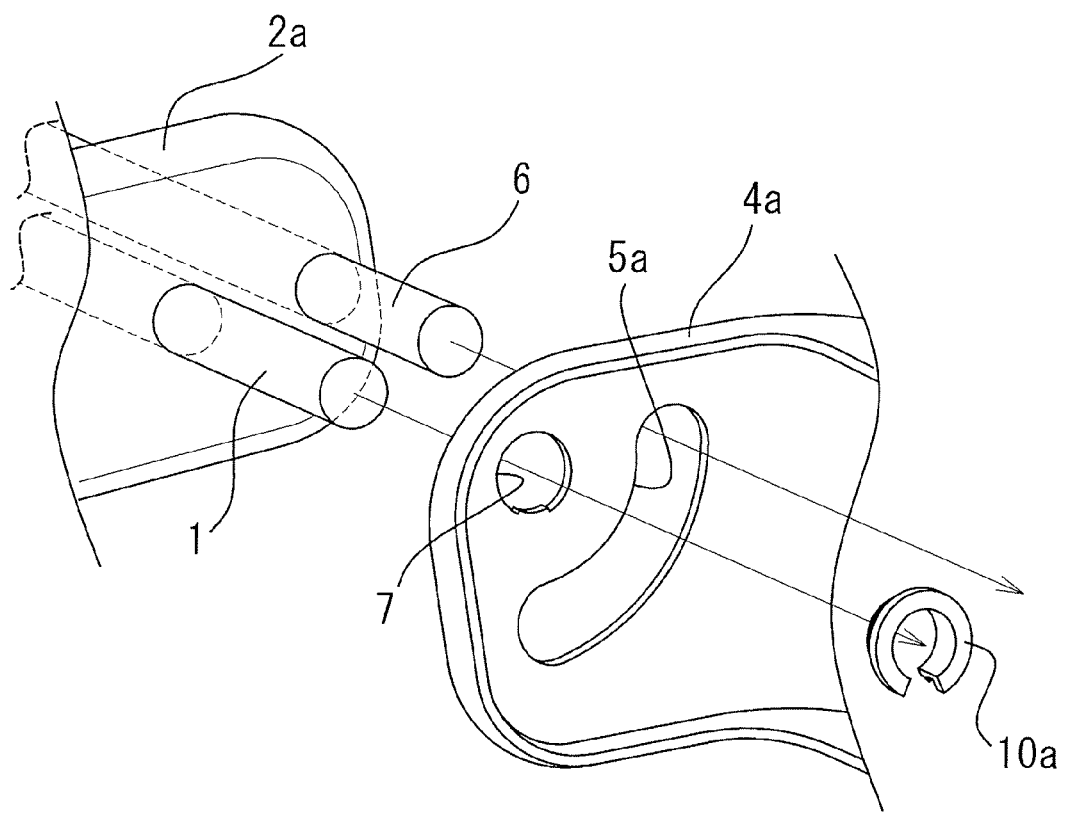
FIG. 2 is an exploded perspective view of the bearing structure using a resin bush shown in FIG. 1.

As shown in FIGS. 1 and 2 (where only one side is shown), the bearing structure of the support shaft 1 using a resin bush is constructed by forming bush bearing holes 7 in the plate faces of the bracket plates 4a and 4b and inserting resin bushes 10a and 10b according to the first embodiment into the bearing holes 7 to be fixed thereto. The entire bushes 10a and 10b are formed of resins such as polyacetal, nylon, and polypropylene by molding.

In the first embodiment, each of the resin bushes 10a and 10b (hereinafter, the resin bush 10a will mainly be described) includes a cylindrical body 11 inserted into the bearing hole 7 (see FIG. 2), a flange 12 disposed at one end of the cylindrical body 11, a locking edge 13 disposed at the other end of the cylindrical body 11, and a circular through-hole 14 extending from the flange 12 to the locking edge 13 through the cylindrical body 11. The flange 12 has a disk-like shape and the locking edge 13 has a right-triangular sectional shape.

Figure 3A:
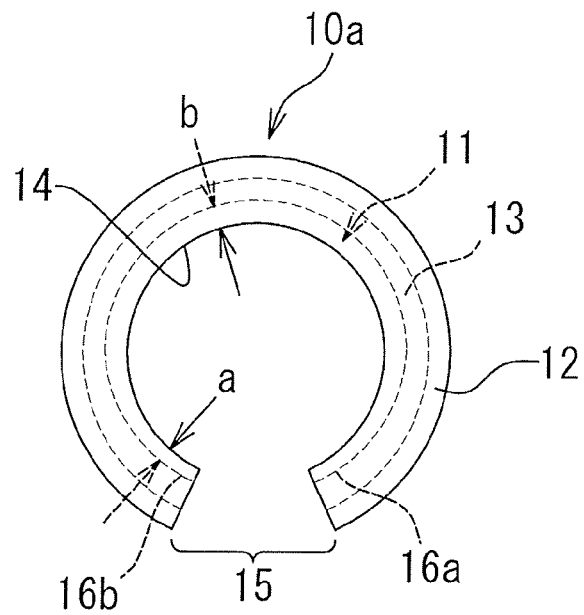
FIG. 3A is a front view of the resin bush shown in FIG. 2.
Figure 3B:
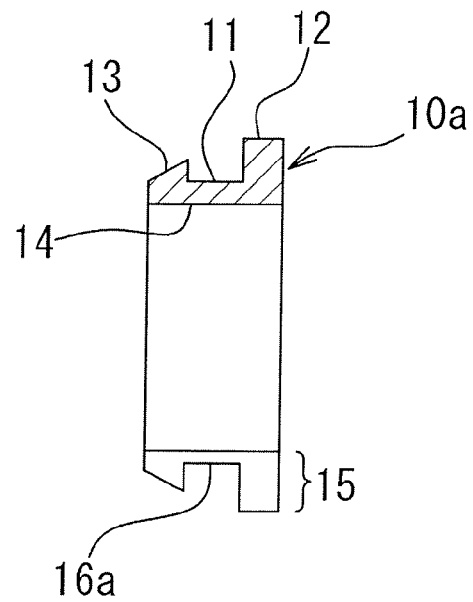
FIG. 3B is a sectional view of the resin bush shown in FIG. 3A.

In the bush 10a, a partition cut 15 opened from the locking edge 13 to the flange 12 through the cylindrical body 11, and thin-walled portions 16a and 16b with a reduced thickness (see reference sign a<b in FIG. 3A) of the cylindrical body 11 extending from both sides of the partition cut 15 to the outer circumferential surface of the cylindrical body 11 are formed. The partition cut 15 may have a V-shape in which the width decreases from the outer circumferential surface to the inner circumferential surface. The thin-walled portions 16a and 16b may be formed substantially over the hillside of the cylindrical body 11.

Figure 4:
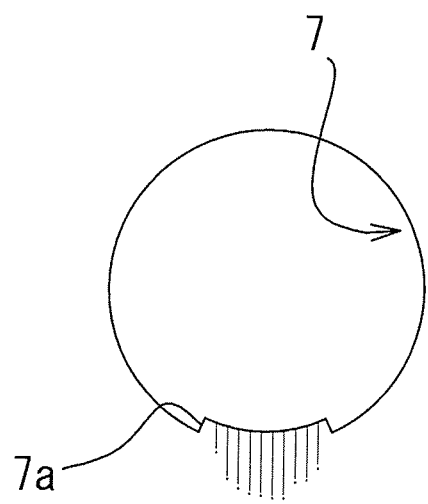
FIG. 4 is a front view of a bearing hole into which the bush shown in FIG. 3B is inserted.

As shown in FIG. 4, in the hole edge of the bearing hole 7, a protrusion 7a is formed to be positioned in the partition cut 15 of the bush 10b. The protrusion 7a is formed not to reach the inner circumferential surface of the through-hole 14 of the bush 10b (see FIG. 3A). The projecting height of the protrusion 7a may substantially correspond to the thickness of the thin-walled portions 16a and 16b of the bush 10a, and the protrusion end surface may have an arc shape substantially corresponding to the circumferential surface of the support shaft 1 (see FIG. 1).

The protrusion 7a receives a load applied to the support shaft 1 as described later. The load applied to the support shaft 1 downwardly acts on the bush 10a due to the structure (see FIG. 1) in which the stopper shaft 6 regulating a rotation range of the armrest is protruded from the plate face of the armrest frame 2a at apposition separated from the support shaft 1 and is inserted into the guide hole 5a. Accordingly, the protrusion 7a is disposed in the lower hole edge of the bearing hole 7.

Figure 6:
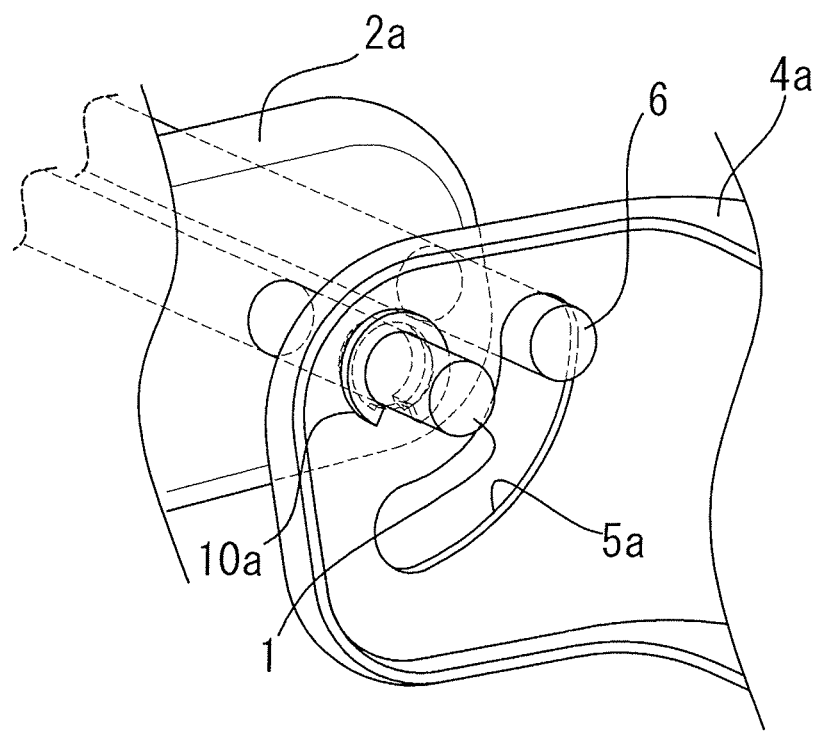
FIG. 6 illustrates the bearing structure using the resin bush shown in FIG. 5.

As shown in FIGS. 5 and 6, the bush 10a is assembled into the bracket plate 4a without drop-out by engaging the cylindrical body 11 with the bearing hole 7, bringing the flange 12 into contact with the plate face of the bracket plate 4a around one hole edge of the bearing hole 7, locking the locking edge 13 to the plate face of the bracket plate 4a around the other hole edge of the bearing hole 7, and inserting the support shaft 1 through the through-hole 14. In the assembling, the bush 10a is squeezed using the partition cut 15, and inserted into the bearing hole 7 from the locking edge 13. Since the partition cut 15 is faced to the protrusion 7a, the positioning for inserting the bush 10a into the bearing hole 7 can be carried out, thereby determining the assembly direction.

When the bush 10a is assembled, as shown in FIG. 7A, the protrusion 7a is positioned within the partition cut 15 and does not reach the inner circumferential surface of the through-hole 14.

As shown in FIG. 7B, when a load (the downward straight arrow) applied to the support shaft 1 acts on the bush 10a, the inner circumferential surface of the through-hole 14 is aligned with the protrusion end surface of the protrusion 7a and the bush 10a is flexibly displaced in the partition cut 15 so that the support shaft 1 is born by the protrusion end surface of the protrusion 7a. Accordingly, even when the resin bush 10a bears the support shaft, the bush 10a can be assembled without being crushed and destroyed.

When the load is released from the support shaft 1 of the armrest, the cylindrical body 11 is spring-like restored at the thin-walled portions 16a and 16b and thus the support shaft 1 is born by the through-hole 14 of the cylindrical body 11, as shown in FIG. 7A.

In the first embodiment, as shown in FIG. 8A, a cutout 17 may be further formed on the opposite side of the partition cut 15 to open the flange 12 and the cylindrical body 11 except for the locking edge 13. While FIG. 8a shows a case where the cutout 17 is formed from the flange 12 to the cylindrical body 11, the cutout 17 may be formed from the locking edge 13 to the cylindrical body 11.

By forming the cutout 17, as shown in FIG. 8B, the entire bush 10a is allowed to be displaced at the cutout 17 (in the upward arc arrow direction) in accordance with the flexible displacement of the cylindrical body 11 at the thin-walled portions 16a and 16b, thereby further promoting the flexible displacement of the cylindrical body 11 so that the bush 10a is surely assembled without being crushed and destroyed.

As shown in FIG. 9A, two cutouts 17a and 17b may be formed at an angle interval of about 120° with respect to the partition cut 15 interposed therebetween. In this case, as shown in FIG. 9B, the entire bush 10a is allowed to be displaced (in the upward arc arrow direction) at the cutouts 17a and 17b in accordance with the flexible displacement of the cylindrical body 11 at the thin-walled portions 16a and 16b.

Resin bushes 20a and 20b according to a second embodiment may be used instead of the resin bushes 10a and 10b according to the first embodiment. As shown in FIGS. 10 and 11, the armrest can be attached to the seat back by using the resin bushes 20a and 20b according to the second embodiment. The same elements as shown in FIGS. 1 and 2 are referenced by like reference numerals and signs and the elements will not be described in detail.

In the second embodiment, as shown in FIGS. 12A to 12C, each of the resin bushes 20a and 20b (hereinafter, the resin bush 20a will mainly be described) each includes a flange 22 having a circular through-hole 21 formed at a center thereof for inserting a support shaft 1 (see FIG. 10) therethrough and three bearing pieces 23a to 23c formed at regular intervals around the through-hole 21 on the flange 22 as a base. The entire bushes 20a and 20b are formed of a resin such as polyacetal or nylon by molding.

The bearing pieces 23a to 23c are provided to face the support shaft 1 inserted through the through-hole 21 and arranged at predetermined intervals around the through-hole 21 so as to rise to be flush with the hole edge of the through-hole 21. From the protrusion ends of the bearing pieces 23a to 23c, locking edges 24a to 24c are continuously extended obliquely outward toward the flange 22 to each have an inversed fingertip shape with a stepped end.

In the flange 22, loopholes 25a to 25c are formed around rising bases of the bearing pieces 23a to 23c. Both sides of the bearing pieces 23a to 23c are provided with guide blades 26a and 26b to 28a and 28b which can slide along both edges of grooves formed in a bearing hole 70 to be described later.

The bearing hole 70 is formed in the plate faces of the bracket plates 4a and 4b. The hole edge of the bearing hole 70 has a circular shape as shown in FIG. 13, and grooves 71a to 71c are formed around the bearing hole 70 so as to be recessed from the hole edge correspondingly with the interval of the bearing pieces 23a to 23c. The grooves 71a to 71c allow the bearing pieces 23a to 23c to be flexibly displaced in the depth direction.

As shown in FIG. 14, the bearing hole 70 has such a diameter that the hole edge of the through-hole 21, through which the support shaft 1 is inserted, of the bush 20a does not protrude into the hole. Specifically, it is set to satisfy the diameter $\phi_1$ of the support shaft 1<the diameter $\phi_2$ of the through-hole 21<the diameter $\phi_3$ of the bearing hole 70.

The grooves 71a to 71c of the bearing hole 70 receive the guide blades 26a and 26b to 28a and 28b of the bearing pieces 23a to 23c and have such a depth that the stepped ends of the locking edges 24a to 24c can be engaged with the deep edges.

As shown in FIGS. 14 and 15, the bush 20a is assembled into the bearing hole 70 by bringing the flange 22 into contact with one surface of the bracket plate 4a, causing the bearing pieces 23a to 23c to protrude from the grooves 71a to 71c of the bearing hole 70 to the other surface of the bracket plate 4a, and engaging the stepped ends of the locking edges 24a to 24c with the deep edges of the grooves 71a to 71c. The support shaft 1 is inserted through the through-hole of the flange 22 within the space between the bearing pieces 23a to 23c to be born with the bush 20a.

In the bearing structure using the bushes 20a and 20b according to the second embodiment, in a normal state, as shown in FIG. 16A, the support shaft 1 is born by the hole edge of the through-hole 21 and the bearing pieces 23a to 23c so that the armrest smoothly rotates about the support shaft 1.

When the armrest is forwardly reclined from the side of the seat back, the stopper shaft 6 comes in contact with the upper hole edge of the guide hole 5a, and an excessive load is applied to the support shaft 1 of the armrest. On this occasion, the bearing pieces 23b and 23c are downwardly pressed by the support shaft 1 from the hole edge of the through-hole 21 and flexibly displaced (in the arrow direction) into the loopholes 25b and 25c as shown in FIG. 16B, whereby the support shaft 1 can be born by the hole edge of the bearing hole 70.

Accordingly, even when the support shaft 1 is born by the bushes 20a and 20b according to the second embodiment, the bushes 20a and 20b can be assembled without being crushed and destroyed.

In addition, since the bearing pieces 23a to 23c protrude from the grooves 71a to 71c of the bearing hole 70 and the locking edges 24a to 24c are engaged with the deep edges of the grooves 71a to 71c, the positioning of the centers of the bushes 20a and 20b with the hole center of the bearing hole 70 can be carried out, and the drop-out of the bushes 20a and 20b from the bearing hole 70 can be prevented. Since the bearing pieces 23a to 23c are formed to be flexible, the entire bush can be flexed and easily assembled into the bearing hole 70. Since the bearing pieces 23a to 23c are faced to the grooves 71a to 71c, the positioning for inserting the bushes 20a and 20b into the bearing holes 70 is carried out, thereby easily determining the assembly direction.

When the bearing pieces 23b and 23c are flexibly displaced into the loopholes 25b and 25c from the hole edge of the through-hole 21 through which the support shaft 1 is inserted, the guide blades 27a, 27b, 28a, and 28b formed on both sides of the bearing pieces 23b and 23c slide along both edges of the grooves 71b and 71c. That is, the guide blades 27a, 27b, 28a, and 28b guide the flexible displacement of the bearing pieces 23b and 23c into the loopholes 25b and 25c from the hole edge of the through-hole 21 through which the support shaft 1 is inserted.

When the load is released from the support shaft 1 of the armrest, the locking edges 24b and 24c pressed by the deep edges of the grooves 71b and 71c and flexed toward the bearing pieces 23b and 23c are restored spring-like, and thus the support shaft 1 can be born by the hole edge of the through-hole 21 and the bearing pieces 23a to 23c as shown in FIG. 16A.

As shown in FIG. 17, two bearing pieces 23a and 23b and two locking edges 24a and 24b may be provided on both sides, or four bearing pieces and four locking edges (not shown) may be provided to be located oblique in the vertical direction at intervals of about 90°. In this case, as shown in FIG. 18, the grooves 71a and 71b corresponding to the number of the bearing pieces and the locking edges can be formed around the bearing hole 70.

In this case, in a normal state, as shown in FIG. 19A, the support shaft 1 is born by the hole edge of the through-hole 21 and the bearing pieces 23a and 23b so that the armrest can smoothly rotates about the support shaft 1.

When an excessive load is applied to the support shaft 1, the bearing pieces 23a and 23b are pressed downwardly by the support shaft 1 from the hole edge of the through-hole 21 through which the support shaft 1 is inserted and are flexibly displaced (in the arrow direction) into the loopholes 25a and 25b, as shown in FIG. 19B, thereby bearing the support shaft 1 with the hole edge of the bearing hole 70. Accordingly, even when the support shaft 1 is born by the bushes 20a and 20b according to this modified example, the bushes 20a and 20b can be assembled without being crushed and destroyed.

In the above-mentioned embodiments, the support shaft is fixed to the armrest frame and the bearing hole is formed in the plate faces of the bracket plates. However, the support shaft may be fixed to protrude laterally from the plate faces of the bracket plates and the bearing hole may be formed in the plate faces of the armrest frames.

While the examples where the bush is applied to the support shaft of the armrest is described, the bearing structure may be applied also to a case where a rear side of a seat cushion is axially attached to a base bracket fixed to a vehicle floor, a case where a link bar of a height adjusting device of a vehicle seat is axially attached, and the like.

The bearing structure can be applied not only to the vehicle but also to various mechanisms in which a resin bush is inserted into and fixed to a bearing hole and a support shaft is inserted through and born by the resin bush. And, the invention can be also applied to a case where a load applied to the support shaft acts upward.

What is claimed is:

1. A bearing structure inserted into and fixed to a bearing hole formed in a substantially vertically-oriented plate member for supportively receiving a support shaft protruded from a workpiece, the bearing structure comprising:
    a resin bush having
        a flange, at one end, formed to be brought into contact with a plate face of the plate member around the bearing hole from one side,
        a locking edge, at the other end, formed to be locked with a plate face of the plate member around the bearing hole from the other side, and
        a circular through-hole, formed through a central portion thereof, to receive the support shaft inserted therethrough,
        the resin bush being configured to be slidably vertically movable to a limited extent with respect to the plate member when a load is applied thereto,
    wherein, upon receiving a load applied to the support shaft, the entire resin bush is flexibly displaced so that an inner circumferential surface of the through-hole is aligned with a hole edge of the bearing hole and the support shaft is supported by said plate member at the hole edge of the bearing hole.

2. The bearing structure of claim 1, wherein the resin bush further has:
    a cylindrical body defining the circular through-hole while being inserted into the bearing hole, the flange being formed at one end of the cylindrical body, the locking edge being formed at the other end of the cylindrical body,
    a partition cut formed to open through the locking edge, the cylindrical body and the flange, and
    thin-walled portions formed to extend from both sides of the partition cut, respectively, along an outer circumferential surface of the cylindrical body with a reduced thickness,
    wherein, in the plate member, a protrusion is formed at the hole edge of the bearing hole to be positioned within the partition cut and not to reach the inner circumferential surface of the through-hole, and
    wherein the resin bush is configured and arranged such that, upon receiving the load applied to the support shaft, the cylindrical body is flexibly displaced at the thin-walled portions so that the inner circumferential surface of the through-hole is aligned with a protrusion end surface of the protrusion and the support shaft comes into direct contact with, and is supported by the protrusion end surface of the protrusion.

3. The bearing structure of claim 2, wherein the resin bush further has a cutout formed to open the cylindrical body except for the flange or the locking edge at a position apart from the partition cut.

4. The bearing structure of claim 1, wherein the resin bush further has:
    a bearing piece formed on the flange to rise from a hole edge of the through-hole so as to face the support shaft inserted through the through-hole, the locking edge being continuously extended from a protrusion end of the bearing piece, and
    a loophole formed in the flange around a rising base of the bearing piece,
    wherein, in the plate member, the bearing hole is formed so that the hole edge thereof does not reach the hole edge of the through-hole and a groove is formed around the hole edge of the bearing hole to receive the bearing piece, and
    wherein the resin bush is configured and arranged such that, upon receiving the load applied to the support shaft, the bearing piece is flexibly displaced into the groove through the loophole so that the inner circumferential surface of the through-hole is aligned with the hole edge of the bearing hole and the support shaft comes into direct contact with, and is supported by the plate member at the hole edge of the bearing hole.

5. The bearing structure of claim 4, wherein the resin bush further has guide blades formed on both sides of the bearing piece to slidingly guide a flexible displacement of the bearing piece along both edges of the groove.

6. An armrest of a vehicle seat, comprising the bearing structure of claim 1, wherein the plate member is one of an armrest frame of the armrest and a backside frame of the vehicle seat, and the workpiece is the other of the armrest frame and the backside frame.

7. The bearing structure of claim 1, wherein the resin bush is configured and arranged such that, upon receiving the load applied to the support shaft, the inner circumferential surface of the through-hole is aligned with the hole edge of the bearing hole, and the support shaft comes into direct contact with the plate member at the hole edge of the bearing hole.

8. The bearing structure of claim 1,
    wherein the plate member has a protrusion formed at the hole edge of the bearing hole, the protrusion extending upwardly,
    and wherein the resin bush is configured and arranged such that, upon receiving the load applied to the support shaft, the resin bush is flexibly displaced so that the support shaft comes into direct contact with, and is supported by the protrusion of the plate member at the hole edge of the bearing hole.

9. The bearing structure of claim 8, wherein the resin bush further has a partition cut formed to open therethrough, the partition cut extending downwardly.

10. In combination, a bearing structure and a substantially vertically-oriented plate member having a bearing hole formed therethrough for supportively receiving a support shaft of a workpiece, the bearing structure being inserted into the bearing hole of the plate member and comprising:

a resin bush having
- a flange, at one end, formed to be brought into contact with a first plate face of the substantially vertically-oriented plate member around the bearing hole from a first side of the plate member,
- a locking edge, at the other end, formed to be locked with a second plate face of the substantially vertically-oriented plate member around the bearing hole from a second side of the plate member, and
- a circular through-hole, formed through a central portion thereof, to receive the support shaft therethrough, wherein:
- the plate member has a protrusion formed therein at an edge of the bearing hole, the protrusion extending upwardly, and
- the resin bush is configured and arranged such that, upon receiving a load applied to the support shaft, the resin bush is flexibly displaced so that the support shaft comes into direct contact with, and is supported by the protrusion of the plate member at the hole edge of the bearing hole.

11. The bearing structure of claim 10, wherein the resin bush further has:
- a cylindrical body defining the circular through-hole while being inserted into the bearing hole, the flange being formed at one end of the cylindrical body, the locking edge being formed at the other end of the cylindrical body,
- a partition cut formed to open through the locking edge, the cylindrical body and the flange, and
- thin-walled portions formed to extend from both sides of the partition cut, respectively, along an outer circumferential surface of the cylindrical body with a reduced thickness,
- wherein, in the plate member, a protrusion is formed at the hole edge of the bearing hole to be positioned within the partition cut and not to reach the inner circumferential surface of the through-hole, and
- wherein the resin bush is configured and arranged such that, upon receiving the load applied to the support shaft, the cylindrical body is flexibly displaced at the thin-walled portions so that the inner circumferential surface of the through-hole is aligned with a protrusion end surface of the protrusion and the support shaft comes into direct contact with, and is supported by the protrusion end surface of the protrusion.

12. The bearing structure of claim 2, wherein the resin bush further has a cutout formed to open the cylindrical body except for the flange or the locking edge at a position apart from the partition cut.

13. The bearing structure of claim 1, wherein the resin bush further has:
- a bearing piece formed on the flange to rise from a hole edge of the through-hole so as to face the support shaft inserted through the through-hole, the locking edge being continuously extended from a protrusion end of the bearing piece, and
- a loophole formed in the flange around a rising base of the bearing piece,
- wherein, in the plate member, the bearing hole is formed so that the hole edge thereof does not reach the hole edge of the through-hole and a groove is formed around the hole edge of the bearing hole to receive the bearing piece, and
- wherein the resin bush is configured and arranged such that, upon receiving the load applied to the support shaft, the bearing piece is flexibly displaced into the groove through the loophole so that the inner circumferential surface of the through-hole is aligned with the hole edge of the bearing hole and the support shaft comes into direct contact with, and is supported by the plate member at the hole edge of the bearing hole.

14. The bearing structure of claim 13, wherein the resin bush further has guide blades formed on both sides of the bearing piece to slidingly guide a flexible displacement of the bearing piece along both edges of the groove.

15. An armrest of a vehicle seat, comprising the bearing structure of claim 10, wherein the plate member is one of an armrest frame of the armrest and a backside frame of the vehicle seat, and the workpiece is the other of the armrest frame and the backside frame.

\* \* \* \* \*